United States Patent

Gadducci et al.

Patent Number: 5,742,224
Date of Patent: Apr. 21, 1998

[54] BASIC CELL FOR COMPARING A FIRST AND A SECOND DIGITAL SIGNAL AND A CORRESPONDING DIGITAL COMPARATOR

[75] Inventors: Paolo Gadducci, Bareggio, Italy; David Moloney, Dublin, Ireland; Francesco Brianti, Piacenza; Valerio Pisati, Bosnasco, both of Italy

[73] Assignee: SGS-Thomson Microelectronics S.r.l., Agrate Brianza, Italy

[21] Appl. No.: 675,772

[22] Filed: Jun. 28, 1996

[30] Foreign Application Priority Data

Jun. 30, 1995 [EP] European Pat. Off. ............ 95830278

[51] Int. Cl.$^6$ .................................................. G06F 7/02
[52] U.S. Cl. ............................................... 340/146.2
[58] Field of Search ...................................... 340/146.2

[56] References Cited

U.S. PATENT DOCUMENTS 4,903,005  2/1990  Sakashita et al. ............... 340/146.2

FOREIGN PATENT DOCUMENTS 0 291 963  11/1988  European Pat. Off. .
0 319 421   6/1989  European Pat. Off. .
60-254233  12/1985  Japan .
62-109124   5/1987  Japan .

Primary Examiner—Margaret Rose Wambach
Attorney, Agent, or Firm—David V. Carlson; Seed and Berry LLP

[57] ABSTRACT

The invention relates to a basic cell for comparing a first and a second digital signal, of the type having at least a first and a second input and a first and a second output and comprising at least one logic gate receiving digital signals at a first and a second signal input, and which comprises at least a first and a second controlled switch inserted in parallel with each other between the output terminal of the logic gate and the second output from the cell, the first switch being also connected between the first input and the first output of the cell and the second switch being also connected between the second input and the second output of the cell. The invention also relates to a digital comparator comprising a plurality of basic cells according to the invention.

27 Claims, 5 Drawing Sheets

BASIC CELL FOR COMPARING A FIRST AND A SECOND DIGITAL SIGNAL AND A CORRESPONDING DIGITAL COMPARATOR

TECHNICAL FIELD

This invention relates to digital integrated circuits, and more particularly to a digital comparator for comparing a first and a second digital signal.

BACKGROUND OF THE INVENTION

As is well known, the technique currently used to compare two digital signals is performed by the subtraction of the signals and evaluating the sign of the result.

A digital comparator of the known type is shown for example in FIG. 1. This comparator 1 is indicated as a whole by the number 1 and includes a chain 2 of inserted cells 3, in parallel with each other, between a first 4 and a second 5 data bus and a logic gate 6 of the NOR type.

In particular, in the example illustrated in FIG. 1, comparator 1 is a three bit comparator and therefore has three cells 3 and one logic gate 6 with three inputs.

Each basic cell 3 incorporated in comparator 1 includes a summator 7 of the Full Adder type having a first input terminal IN 1 connected to the first data bus 4 and a second input terminal IN 2 connected to the second data bus 5 via a buffer 8, as well as an output terminal O1 connected to logic gate 6.

Data buses 4 and 5 respectively carry a first digital signal A and a second digital signal B, in particular a three bit signal.

Each Full Adder summator 7 has a further input terminal IN3 which receives an input reference signal Cin and a further output terminal O2 which generates an output reference signal Cout. The latter becomes the reference input signal for the summator in the next cell along in chain 2.

The first cell in chain 2 receives a voltage value $V_s$ corresponding to a high logic value or logic "1" at input terminal IN3, while the last cell in chain 2 provides a high logic value at its output terminal O2, which coincides with a first output terminal OUT1 of digital comparator 1, when digital signal B has a logic value greater than digital signal A.

Digital comparator 1 has a second output terminal OUT2, which coincides with the output terminal from logic gate 6, which provides a high logic value when signals A and B coincide.

The principal limit to this known arrangement is the digital comparator's response time, which increases, as in all known summators, as the number of bits making up the signals A and B under comparison increases.

This disadvantage is particularly unfavourable in high frequency applications, which require short transit times for signals through the digital comparator.

In order to overcome this disadvantage Full Adder summators constructed using large transistors, thus able to switch in a short time, have to be used.

This however increases the area occupied by digital comparator 1, and the costs of manufacturing it increase.

Therefore, it would be advantageous to devise a digital comparator having structural and functional characteristics which enable it to overcome the disadvantages of the digital comparators constructed according to the known art.

SUMMARY OF THE INVENTION

According to the principles of the present invention, there is provided a basic cell which incorporates transistors of the pass-gate type in order to indicate equality between the digital signal inputs.

The invention relates to a basic cell having at least a first and a second input and a first and a second output and including at least one logic gate receiving the digital signals at a first and a second signal input.

The invention also relates to a digital comparator for comparing a first and a second digital signal, having at least one first and one second input terminal and at least one inequality output and out equality output. The comparator includes a chain of cells connected to a first and a second data bus for transmitting the first and second digital signals.

The invention relates in particular, but not exclusively, to a three bit digital comparator and the description which follows is made with reference to this example application solely for the purpose of simplifying the description.

BRIEF DESCRIPTION OF THE DRAWINGS

The features and advantages of the basic cell and the comparator according to the invention will be apparent from the description below of embodiments given by way of non-restrictive illustration with reference to the appended drawings.

DETAILED DESCRIPTION OF THE INVENTION

Figure 1:
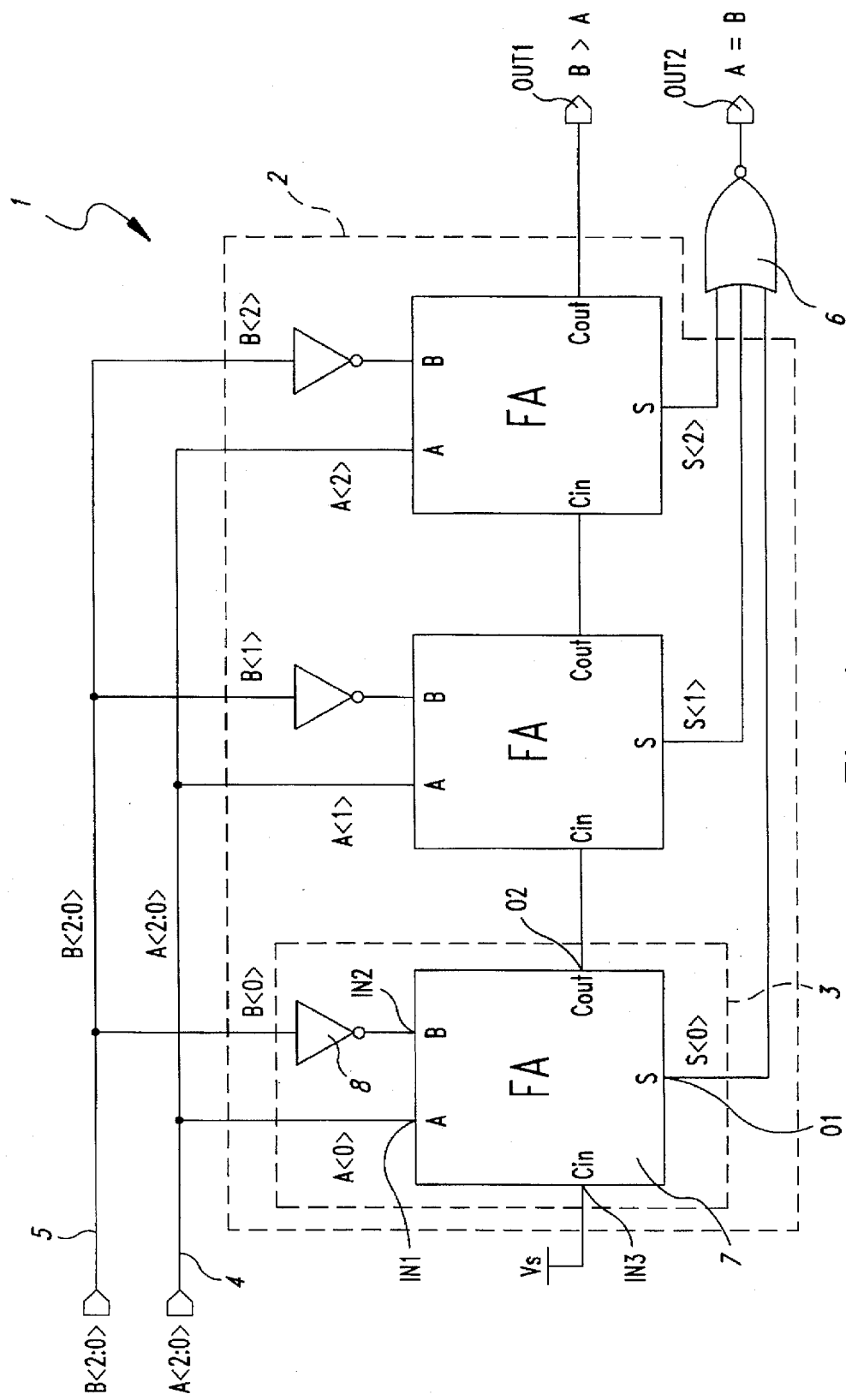
FIG. 1 illustrates a digital comparator constructed according to the known art.
Figure 2:
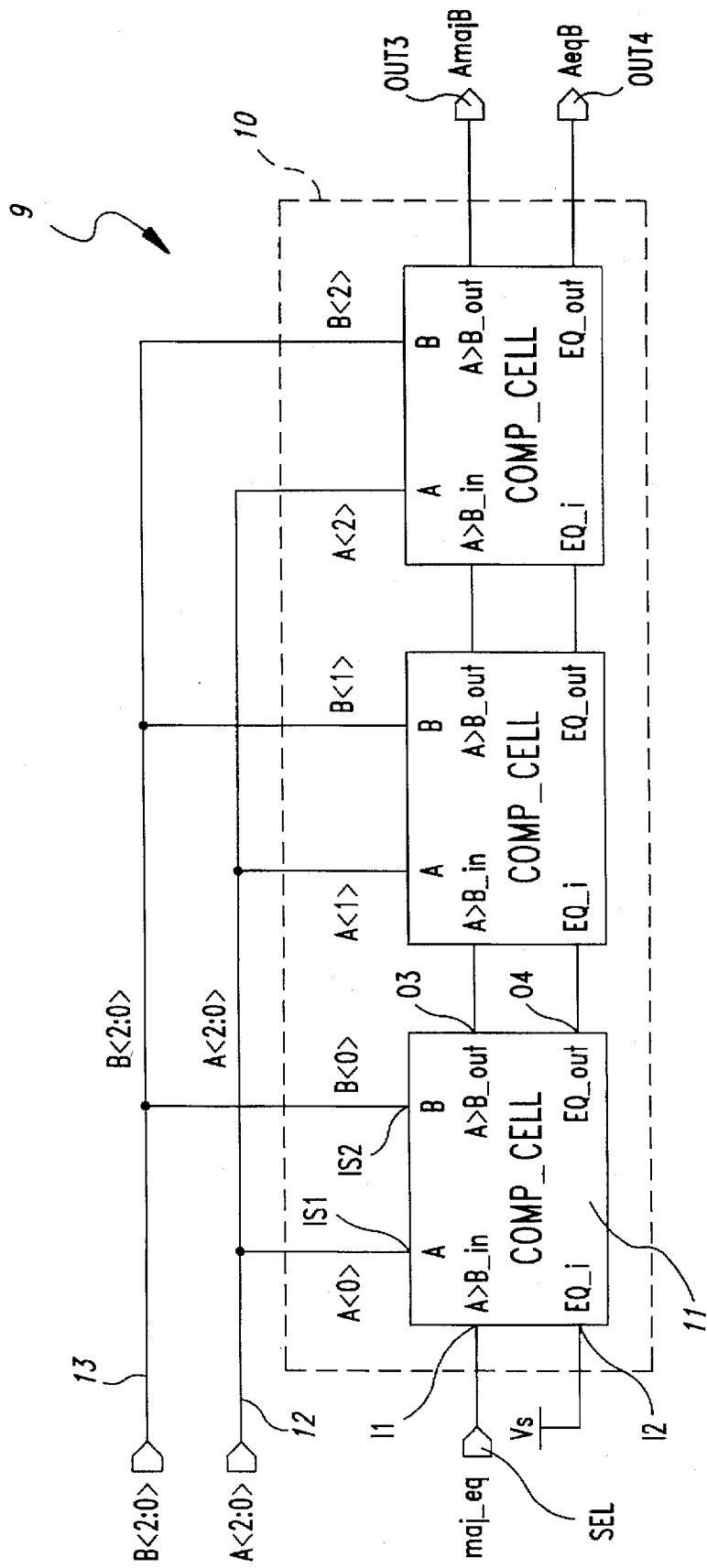
FIG. 2 illustrates diagrammatically a digital comparator constructed according to the invention.

With reference to these figures and in particular FIG. 2, reference numeral 9 indicates a digital comparator constructed according to the invention as a whole.

Digital comparator 9 includes a chain 10 of cells 11, each of which have a first signal input IS 1 and a second signal input IS2 connected respectively to a first 12 and a second 13 data bus, which are designed to transmit digital input signals A and B.

Each basic cell 11 also includes an inequality input I1 and an inequality output O3 connected to the inequality input of the subsequent cell in chain 10, together with an equality input I2 and an equality output O4 connected to the equality input of the next cell in chain 10.

The first cell in chain 10 receives a switching signal SEL at inequality input I1 and receives a voltage value $V_s$ corresponding to a high logic value or logic "1" at equality input I2.

Digital comparator 9 has a first output terminal OUT3, which coincides with the inequality output O3 of the last cell in chain 10. Output terminal OUT3 generates a high logic value when digital signal A is greater than digital signal B.

A second output terminal OUT4, which coincides with the equality output O4 of the last cell in chain 10, generates a high logic value when signals A and B coincide.

Figure 3:
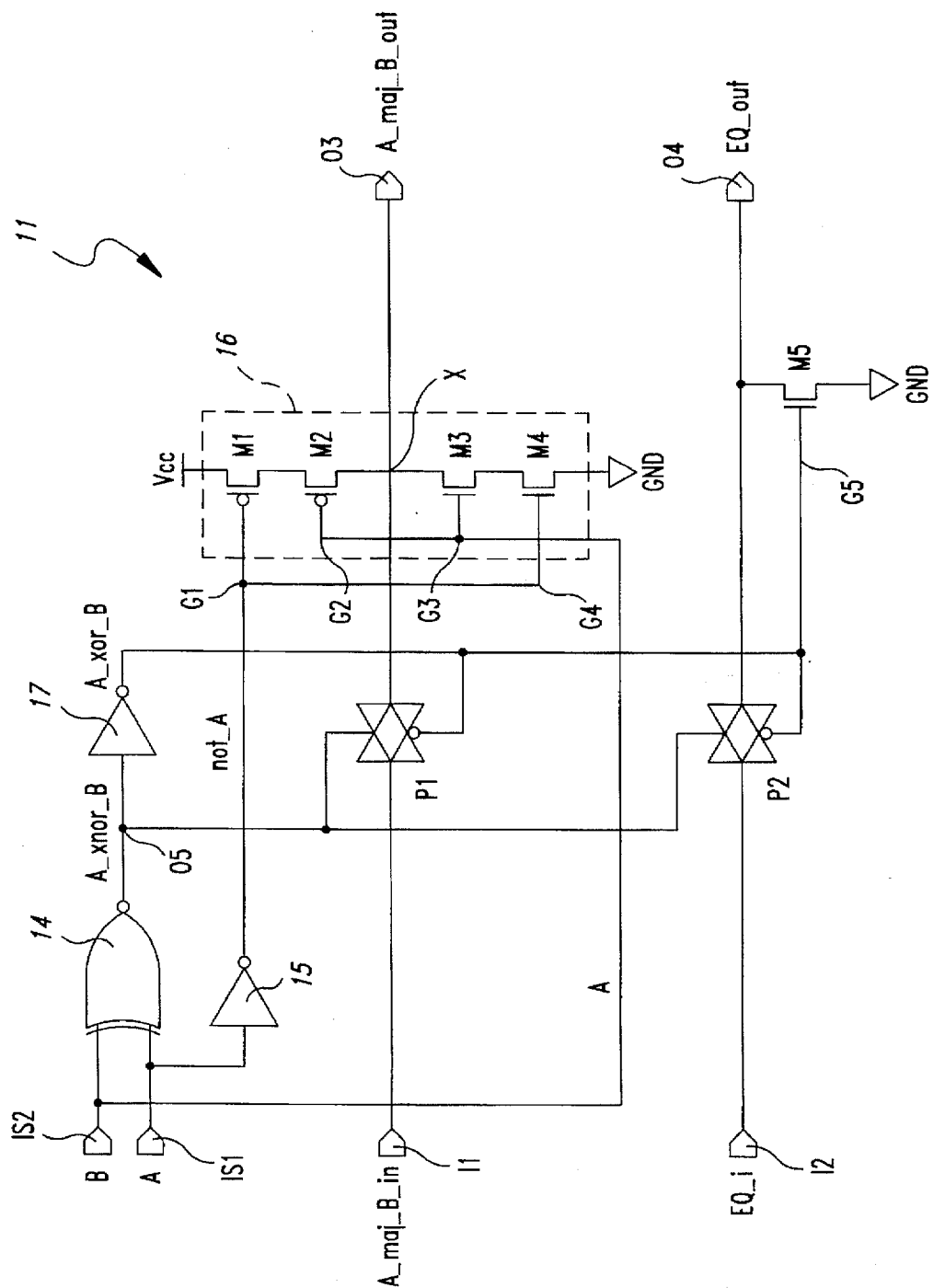
FIG. 3 illustrates a basic cell incorporated in the digital comparator in FIG. 2.

Now with particular reference to FIG. 3, each basic cell 11 comprises a comparison logic circuit such as a logic gate 14 of the XNOR type, having a first input which coincides with the first signal input IS1 of cell 11 and receives first digital signal A and a second input which coincides with the second signal input IS2 of cell 11 and receives second digital signal B.

First signal input IS1 is also connected through an inverter or buffer 15 to a divider 16 of transistors M1, M2, M3 and M4, inserted between a first supply reference voltage Vcc and a second reference voltage, in particular an earth GND.

Divider 16 includes the series of a first M1 and a second M2 P channel MOS transistor inserted between supply reference voltage Vcc and inequality output O3 of cell 11. A third M3 and a fourth M4 N channel MOS transistor are inserted between this output O3 and earth GND. The divider 16 is also referred to as an output circuit whose function will be explained later herein.

First transistor M1 and fourth transistor M4 have control terminals, G1 and G4 respectively, connected together and to the first signal input IS1 via buffer 15. Similarly second transistor M2 and third transistor M3 have control terminals, G2 and G3 respectively, connected together and to second signal input IS2 of cell 11.

Inequality input I1 of cell 11 is connected to inequality output O3 via a first pass-transistor P1 or a pass-gate depending on the technology used, which is inserted between output O5 of logic gate 14 and a control terminal G5 of a further N channel MOS transistor M5 in parallel with a further buffer 17 and a second pass-transistor P2. The phrase "transmission gate" or "pass-gate" as used herein includes a single N-channel or P-channel transistor, or a pair of N-channel and P-channel transistors in parallel and receiving complementary inputs. Transistor M5 is inserted between equality output O4 of cell 11 and earth GND. Equalising input I2 is connected to equality output O4 of cell 11 via the second pass transistor P2.

We will now see how cell 11 operates according to the invention.

When input signals A and B are equal, pass-transistors P1 and P2 are activated and transfer the relative values of the output from the preceding cell in chain 10 of digital comparator 9 to outputs O3 and O4. These values, which are present at inputs I1 and I2 of cell 11 are in fact the results of a comparison relating to the bits of lower weight of digital signals A and B.

When on the other hand input signals A and B are different, pass-transistors P1 and P2 are kept inactive by the outputs of the XNOR gate 14 and buffer 17, and the transistors M1 and M5 force outputs O3 and O4 to the correct values. Pass-transistors P1 and P2 therefore effectively operate as control switches.

The initial cell in chain 10 of digital comparator 9 receives switching signal SEL at inequality input I1. Advantageously, according to the invention, switching signal SEL coincides with the value adopted by output O3 in the presence of two equal input signals A and B. It is therefore possible by varying switching signal SEL to test greater-equal or smaller-equal conditions using the same digital comparator 9.

Figure 4:
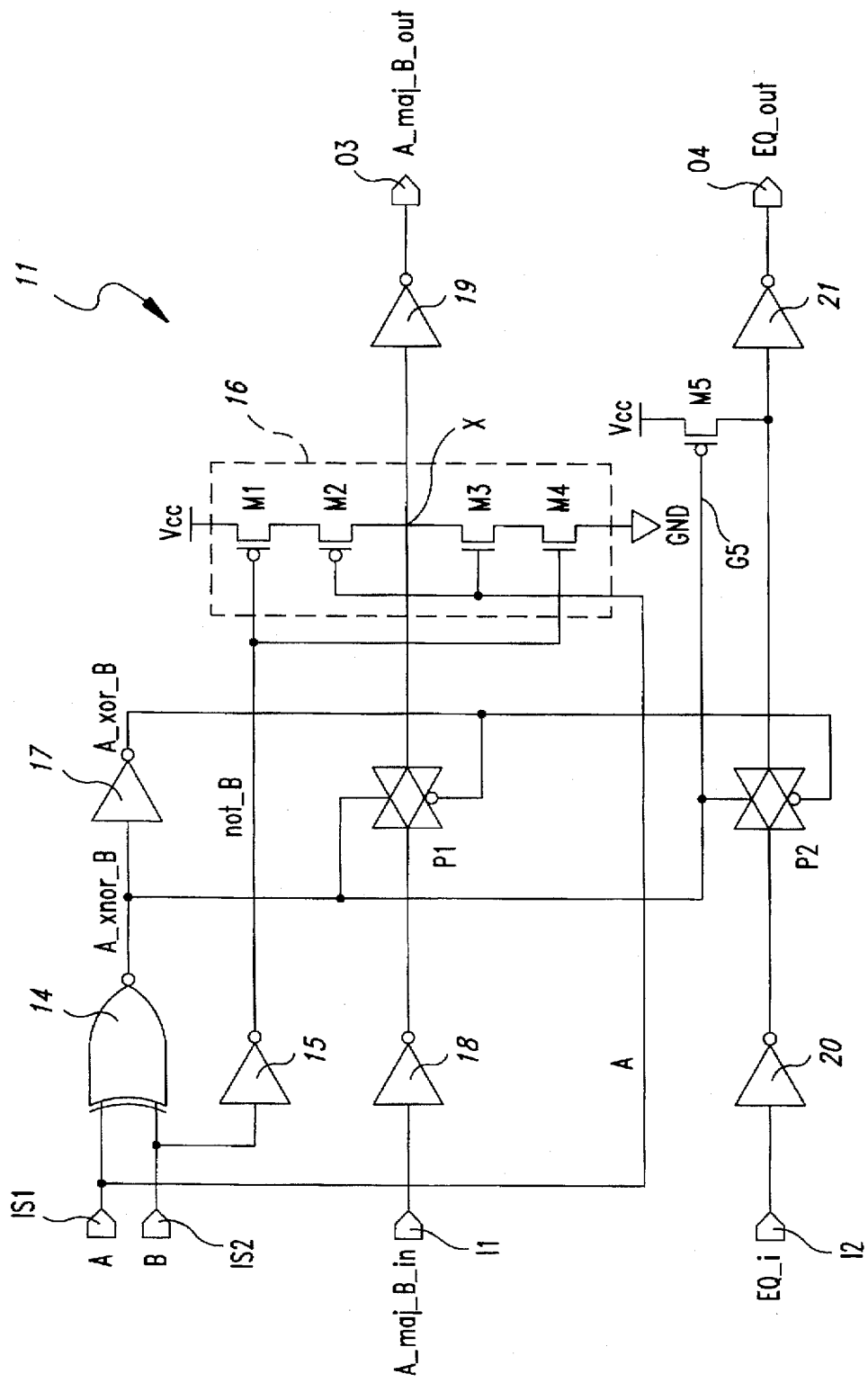
FIG. 4 shows an alternative embodiment of the basic cell in FIG. 3.

FIG. 4 illustrates an alternative embodiment of cell 11 according to the invention.

Inequality input I1 is connected to first pass-transistor P1 via a first input buffer 18, while inequality output O3 is connected to a central node X of transistor divider 16 via a first output buffer 19. Similarly, equality input I2 is connected to pass-transistor P2 via a second input buffer 20, while equality output O4 is connected to pass-transistor P2 via a second output buffer 21.

In this embodiment, transistor M5 is a P channel transistor and is inserted between the supply reference voltage Vcc and output buffer 21. In addition to this transistor M5 has its control terminal G5 connected to both pass-transistor P1 and pass-transistor P2. Advantageously in accordance with this embodiment, the input and output buffers regenerate the levels of the signals deteriorated by passage through the pass-transistors of cell 11.

Figure 5:
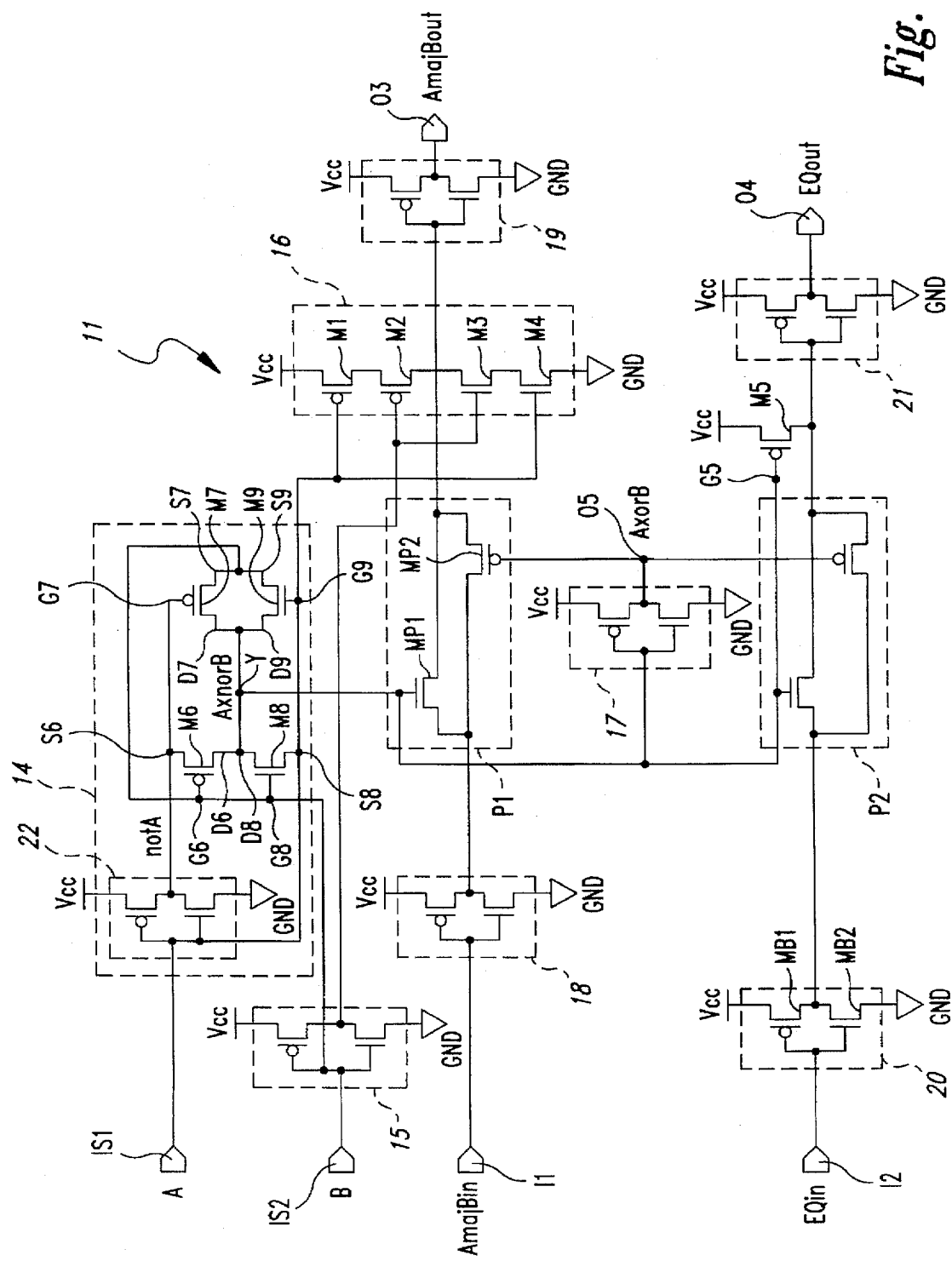
FIG. 5 shows in detail the electrical diagram for the basic cell in FIG. 4.

Finally, FIG. 5 illustrates in detail the electrical diagram for cell 11 according to the embodiment in FIG. 4.

All the input and output buffers are constructed using a first P channel MOS transistor MB1 in series with a second N channel MOS transistor MB2, inserted between the supply reference voltage Vcc and earth GND, and having common control terminals, as shown in block 20.

Pass-transistors P1 and P2 include a first N-channel MOS transistor MP1 and a second P channel MOS transistor MP2 having drain and source terminals in common and connected to inputs I1 and I2 and outputs O3 and O4 respectively. In particular the control terminals of the N channel transistors MP1 of pass-transistors P1 and P2 are connected together, to inequality input I1 of cell 11 and output O5 of logic gate 14 via buffer 17, while the control terminals for P channel transistors MP2 are directly connected to output O5.

A possible embodiment of XNOR logic gate 14 includes an input buffer 22 inserted between supply reference voltage Vcc and earth GND and connected to a first signal input IS1 and source terminal S6 of a first P channel MOS transistor M6. The source S6 of transistor M6 is also connected to control terminal G7 of a second P channel MOS transistor M7. Drain terminal D6 of transistor M6 is connected to drain terminal D8 of a third N channel MOS transistor M8, and to the drain terminals D7 and D9 of second transistor M7 and a further fourth N channel MOS transistor M9.

Transistors M6 and M8 have their control terminals G6 and G8 in common and connected to buffer 15, and to common source terminals S7 and S9 of transistors M7 and M9. Also, fourth transistor M9 has its control terminal G9 connected to the source terminal S8 of third transistor M8 and signal input IS1.

One main advantage of the digital comparator according to the invention is that all cells 11 in chain 10, except for the cell relating to the most significant bits which begin the chain, are loaded by identical cells. The capacity of each basic cell to deliver current can therefore be limited. This is reflected in the possibility of using transistors of smaller size in comparison with those used in devices according to the known art. The cell relating to the most significant bits must instead be able to pilot standard loads. All this can be achieved simply by suitably dimensioning the regeneration buffer in the embodiment of cell 11, shown in FIG. 4.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A one-bit digital comparator unit for comparing first and second digital signals, comprising:

a comparison logic circuit having a comparison output, and first and second inputs for respectively receiving the first and second digital signals;

an inequality input and inequality output;

an equality input and equality output;

a first transmission gate connected between the inequality input and the inequality output, the first transmission gate being operable to pass the logic value at the inequality input onto the inequality output in response to the comparison output;

a second transmission gate connected between the equality input and the equality output, the second transmission gate being operable to pass the logic value at the equality input onto the equality output in response to the comparison output; and an output circuit having first and second inputs respectively connected to the first and second inputs of the comparison logic circuit, the output circuit having an output connected to the inequality output.

2. A one-bit digital comparator unit for comparing first and second digital signals, comprising:

a comparison logic circuit having a comparison output, and first and second inputs for respectively receiving the first and second digital signals;

an inequality input and inequality output;

an equality input and equality output;

a first transmission gate connected between the inequality input and the inequality output, the first transmission gate having a control input connected to the comparison output;

a second transmission gate connected between the equality input and the equality output, the second transmission gate having a control input connected to the comparison output; and an output circuit having first and second inputs respectively connected to the first and second inputs of the comparison logic circuit, the output circuit having an output connected to the inequality output.

3. The one-bit digital comparator unit according to claim 2 wherein the output circuit comprises:

a first pair of P-channel transistors connected in series; and a second pair of N-channel transistors connected in series, the first and second pair being connected in series with each other and a common node therebetween defining the output of the output circuit, the control input of one transistor from each pair being connected to the first input of the comparison logic circuit and the control input of the other transistor from each pair being connected to the second input of the comparison logic circuit.

4. The one-bit digital comparator unit according to claim 3, further comprising an inverter connected between the first input of the comparison logic circuit and the first input of the output circuit.

5. The one-bit digital comparator unit according to claim 2 wherein each transmission gate includes:

an N-channel transistor having a control input; and a P-channel transistor having a control input and connected in parallel with the N-channel transistor.

6. The one-bit digital comparator unit according to claim 5, further comprising:

an inverter having an input connected to the comparison output and an output connected to the control input of one of the control inputs of each transmission gate; and wherein the comparison output is connected to the control input of the other control input of each transmission gate.

7. The one-bit digital comparator unit according to claim 2, further comprising:

a MOS transistor connected between the equality output and a reference voltage, the MOS transistor being operable to force the equality output to a predetermined logic state responsive to the comparison output.

8. The one-bit digital comparator unit according to claim 2, further comprising:

a first input buffer connected between the first transmission gate and the inequality input; and a second input buffer connected between the second transmission gate and the equality input.

9. The one-bit digital comparator unit according to claim 2, further comprising:

a first output buffer connected between the first transmission gate and the inequality output; and a second output buffer connected between the second transmission gate and the equality output.

10. The one-bit digital comparator unit according to claim 9 wherein each output buffer includes an inverter.

11. The one-bit digital comparator unit according to claim 2 wherein the comparison logic circuit includes a XNOR logic gate.

12. The one-bit digital comparator unit according to claim 2 wherein the output circuit generates at its output one logic state when the first digital signal is at logic high and the second digital signal is at logic low and generates another logic state otherwise.

13. The one-bit digital comparator unit according to claim 2 wherein the logic comparison circuit disables the second transmission gate when the first and second digital signals are at different logic states, and enables the second transmission gate otherwise.

14. A basic cell for comparing a first and a second digital signal, comprising:

at least one first and one second input;

one first and one second output:

at least one logic gate, receiving the said digital signals at a first and a second signal input;

at least a first and a second control switch connected in parallel to each other between an output terminal of the logic gate and the first and second outputs from the cell, respectively, the said first switch also being connected to the first input, and the said second switch also being connected to the second input; and an output circuit having first and second inputs respectively connected to the first and second signal inputs, the output circuit having an output connected to the first output of the cell.

15. A basic cell according to claim 14, characterised in that the output circuit further includes a transistor divider inserted between a first supply reference voltage and a second reference voltage, an intermediate circuit node of the said transistor divider being connected to the first output of the cell.

16. A basic cell according to claim 15, characterised in that the said transistor divider comprises at least a first, a second, a third and a fourth MOS transistor in series with each other, the said second and third transistors having their control terminals connected together and to the first signal input of the logic gate and the said first and fourth transistors having their control terminals connected together and to the second signal input of the logic gate via a first buffer.

17. A basic cell according to claim 14, further comprising:

a MOS transistor having a terminal inserted between the second output of the cell and the second control switch, and having a second terminal connected to a reference voltage, the MOS transistor and the second control switch controlled by the same signal.

18. A basic cell according to claim 14, characterised in that the output from the said logic gate is directly connected to the control terminal of a MOS transistor inserted between a first supply reference voltage and the second output of the cell.

19. A basic cell according to claim 14, characterised in that it comprises a buffer inserted in parallel with the switches at the output from the logic gate.

20. A basic cell according to claim 14, characterised in that the first switch is connected to the first input of the cell via a first input buffer and to the first output of the cell via a first output buffer.

21. A basic cell according to claim 14, characterised in that the second switch is connected to the second input of the cell through a second input buffer and to the second output via a second output buffer.

22. A basic cell according to claim 14, characterised in that the said first and second switches are MOS transistors of the pass-gate type, each comprising at least a first and second MOS transistor having the drain and source terminals connected together.

23. A digital comparator for comparing the first and second digital signals, having at least a first and a second comparator input terminal and at least one comparator inequality output and a comparator equality output and comprising a chain of cells connected to a first and a second data bus to transmit the said first and second digital signals, characterised in that the said chain comprises at least one cell according to claim 1.

24. A digital comparator according to claim 23, characterised in that each cell of the chain, except the last, has its first output connected to the first input of the subsequent cell in the chain and the second output connected to the second input of the subsequent cell in the chain.

25. A digital comparator according to claim 24, characterised in that the last cell in the chain has its inequality output connected to the inequality output of the digital comparator and its equality output connected to the equality output of the digital comparator.

26. A digital comparator according to claim 25, characterised in that the first cell of the chain receives a voltage value corresponding to a high logic value or logic "1" at its equality input and receives a switching signal at its inequality input.

27. A method for comparing first and second digital input signals by means of a digital comparator having at least a first and a second input terminal and at least one inequality output terminal and an equality output terminal and comprising a chain of cells connected to a first and a second data bus which carry the said first and second digital signals, characterised in that:

when the input signals are equal, each cell in the chain transfers the values at an inequality output and at an equality output from the preceding cell in the chain to an inequality output and an equality output in that individual cell; and when instead the input signals are different, each cell generates its own values for the inequality output and equality output of that cell.

* * * * *